United States Patent
Saito et al.

(10) Patent No.: US 11,633,880 B2
(45) Date of Patent: Apr. 25, 2023

(54) CLEANING AGENT COMPOSITION AND MOLDING RAW MATERIAL

(71) Applicant: SEIKI CORPORATION, Yonezawa (JP)

(72) Inventors: Tsutomu Saito, Yonezawa (JP); Koichi Uehara, Yonezawa (JP); Hajime Sakano, Yonezawa (JP)

(73) Assignee: SEIKI CORPORATION, Yonezawa (JP)

( * ) Notice: Subject to any disclaimer, the term of this patent is extended or adjusted under 35 U.S.C. 154(b) by 595 days.

(21) Appl. No.: 16/734,109

(22) Filed: Jan. 3, 2020

(65) Prior Publication Data

US 2020/0139591 A1    May 7, 2020

Related U.S. Application Data

(63) Continuation of application No. PCT/JP2017/047318, filed on Dec. 28, 2017.

(30) Foreign Application Priority Data

Jul. 6, 2017    (JP) .............................. JP2017-133031

(51) Int. Cl.

| | |
|---|---|
| B29C 33/72 | (2006.01) |
| C08K 5/103 | (2006.01) |
| C08L 23/12 | (2006.01) |
| C08L 69/00 | (2006.01) |
| C08L 71/02 | (2006.01) |
| B29C 45/17 | (2006.01) |
| C08K 5/09 | (2006.01) |
| C08K 5/11 | (2006.01) |
| C08K 5/12 | (2006.01) |
| B29K 101/12 | (2006.01) |
| B29K 71/00 | (2006.01) |

(52) U.S. Cl.
CPC ........ *B29C 33/722* (2013.01); *B29C 45/1753* (2013.01); *C08K 5/09* (2013.01); *C08K 5/103* (2013.01); *C08K 5/11* (2013.01); *C08K 5/12* (2013.01); *C08L 23/12* (2013.01); *C08L 69/00* (2013.01); *C08L 71/02* (2013.01); *B29K 2071/02* (2013.01); *B29K 2101/12* (2013.01)

(58) Field of Classification Search
CPC ... B29C 33/722; B29C 45/1753; C08L 71/02; C08K 5/09; C08K 5/11; C08K 5/12; C11D 1/667; C11D 3/3707
See application file for complete search history.

(56) References Cited

U.S. PATENT DOCUMENTS

2004/0253530 A1 * 12/2004 Serizawa ........... G03G 15/2057
                                                              430/124.1
2014/0371125 A1    12/2014 Wakita
2015/0021802 A1    1/2015 Wakita

FOREIGN PATENT DOCUMENTS

| EP | 2 808 149 A1 | 12/2014 | |
|---|---|---|---|
| JP | 06-134770 A | 5/1994 | |
| JP | H06134770 A | 5/1994 | |
| JP | 2718727 B2 * | 2/1998 | |
| JP | 3051204 B2 | 6/2000 | |
| JP | 2002-020794 A | 1/2002 | |
| JP | 2002-160265 A | 6/2002 | |
| JP | 2003276072 A | 9/2003 | |
| JP | 2006219568 A | 8/2006 | |
| JP | 2006256236 A | 9/2006 | |
| JP | 2007021765 A | 2/2007 | |
| JP | 2011020416 A | 2/2011 | |
| JP | 2013154484 A | 8/2013 | |
| JP | WO 2013/111633 A1 | 8/2013 | |
| JP | 2015010174 A | 1/2015 | |
| WO | WO-2012090620 A1 * | 7/2012 | ........... B29C 33/722 |
| WO | 2019008797 | 1/2020 | |

OTHER PUBLICATIONS

Meisei Chemical Works (Alkox E, R series, Meisei Chemical Works, Ltd., 2022, 5 pages).*
Machine translation of WO 2012090620 (2012, 5 pages).*
Machine translation of JP 2007-021765 (2007, 6 pages).*
Machine translation of JP 2718727 (1998, 4 pages).*
Extended European Search Report for European patent application EP17917008, dated Feb. 16, 2021.
International Search Report dated Feb. 20, 2018.
Notification of Reason for Refusal, Korean App. No. 10-2019-7030045, dated Dec. 17, 2021.
Communication Pursuant to Article 94(3) EPC for EP App. No. 17917008.9-1014, dated Aug. 23, 2022.

* cited by examiner

*Primary Examiner* — Brieann R Johnston
(74) *Attorney, Agent, or Firm* — Fresh IP PLC; Clifford D. Hyra; Aubrey Y. Chen (57) ABSTRACT

A cleaning agent composition contains 100 parts by weight of polyethylene oxide; 25 parts by weight to 90 parts by weight of at least one type of fatty acid ester that is selected from glycerin fatty acid ester, polyglycerin fatty acid ester, or sorbitan fatty acid ester; and 15 parts by weight to 45 parts by weight of a metal salt of a fatty acid and/or a hydroxyfatty acid. The cleaning agent composition is used for cleaning a flow channel for resin in a hot runner type mold.

16 Claims, 1 Drawing Sheet

CLEANING AGENT COMPOSITION AND MOLDING RAW MATERIAL

CROSS-REFERENCE TO RELATED APPLICATION

The present application is a continuation application of International Application No. PCT/JP2017/047318, filed Dec. 28, 2017, claiming the priority of Japan Patent Application No. 2017-133031 filed Jul. 6, 2017. The contents of these applications are incorporated herein by reference in their entirety.

TECHNICAL FIELD

The present invention relates to a cleaning agent composition and a molding raw material, and particularly, to a cleaning agent composition that substitutes a resin in a runner in hot runner type injection molding, and a molding raw material containing the cleaning agent composition.

BACKGROUND ART

An injection molding technology of plastics has been used as a manufacturing means and a forming means of products or components in various fields of the industry and has been widely used even in a field where a high accuracy is required. In such injection molding, a mold has an important function in molding along with a molding machine.

Recently, in order to more effectively use resources, various attempts have been conducted in the field of injection molding, such as resource saving and recycling. Among them, a hot runner type injection molding method of heating a flow channel for resin has been widely adopted. The hot runner type injection molding method is also referred to as a runnerless type injection molding method. In hot runner type molding (hereinafter, also referred to as "hot runner molding"), a sprue or a runner (hereinafter, also referred to as a "hot runner flow channel") that is a flow channel for injecting a molten resin into a mold is positioned in a fixed mold and heating is performed such that a molten state of the resin is maintained. In the hot runner molding, the heated molten resin is directly injected into a cavity that is formed between the fixed mold and a movable mold from an injection port of the fixed mold. In this case, a space for the sprue or the runner as the flow channel of the molten resin is not provided in the movable mold, and thus, the sprue or the runner that is secondarily generated in the molding of the related art is not generated (for example, JP 2002-160265 A). The hot runner molding in which the sprue or the runner is not generated is advantageous from the viewpoint of resource saving and cost reduction.

SUMMARY OF THE INVENTION

Problem to be Solved by the Invention

In the hot runner molding, in a case where the type or the color of the molding raw material is changed, it is necessary to substitute the molding raw material remaining in the hot runner flow channel of the fixed mold (before change or before substitution) with another molding raw material (after change or after substitution). In general, a purge agent is used as a cleaning agent composition that is put into the flow channel for resin in order to discharge the molding raw material remaining in the flow channel for resin.

However, the purge agent is designed to discharge the molding raw material remaining in the cylinder of a molding machine provided with a screw, and in many cases, the remaining molding raw material is discharged by using a high shear force due to the rotation of the screw. For this reason, it is difficult to effectively discharge the molding raw material remaining in the hot runner flow channel that is a space a screw is not provided.

In addition, in general, the purge agent is used properly in accordance with the type of molding raw material to be cleaned. Further, in a case where the hot runner flow channel is filled with the next molding raw material after the molding raw material in the hot runner flow channel is discharged by using the purge agent, there is a case where still another purge agent is required. That is, in the case of performing cleaning by using the purge agent of the related art, the remaining molding raw material is substituted with the purge agent and then the purge agent is substituted with the next molding raw material. Thus, at least two substitution operations are required.

The present invention has been made in consideration of the circumstances described above, and an exemplary object thereof is to provide a cleaning agent composition that is capable of efficiently performing the substitution of a molding raw material in a hot runner type mold and a molding material.

Means for Solving the Problem

In order to attain the object described above, the present invention has the following configurations.

(1) A cleaning agent composition, containing: 100 parts by weight of polyethylene oxide; 25 parts by weight to 90 parts by weight of at least one type of fatty acid ester that is selected from glycerin fatty acid ester, polyglycerin fatty acid ester, or sorbitan fatty acid ester; and 15 parts by weight to 45 parts by weight of a metal salt of a fatty acid and/or a hydroxyfatty acid, in which the cleaning agent composition is used for cleaning a flow channel for resin in a hot runner type mold.

Other objects or other characteristics of the present invention will be apparent by preferred embodiments that will be described with reference to the drawings attached below.

Advantageous Effects of the Invention

A cleaning agent composition and a molding material of the present invention are capable of efficiently performing the substitution of a molding raw material in a hot runner type mold.

DESCRIPTION OF THE EMBODIMENTS

Embodiment 1

Hereinafter, a cleaning agent composition according to Embodiment 1 of the present invention will be described. The cleaning agent composition according to Embodiment 1 is a cleaning agent composition, containing at least: 100 parts by weight of polyethylene oxide; 25 parts by weight to 90 parts by weight of at least one type of fatty acid ester that is selected from glycerin fatty acid ester, polyglycerin fatty acid ester, and sorbitan fatty acid ester; and 15 parts by weight to 45 parts by weight of a metal salt of a fatty acid and/or a hydroxyfatty acid.

The cleaning agent composition according to Embodiment 1 may be contained in a molding raw material of a product that is produced by injection molding at the time of being used. The cleaning agent composition is mixed and dispersed in the molding raw material and thus it becomes possible to discharge the molding raw material easily. That is, the cleaning agent composition of Embodiment 1 can be added to the molding raw material as a master batch for improving substitution performance of the molding raw material.

As described above, by adding the cleaning agent composition to the molding raw material as the master batch, it becomes possible to perform substitution without using a separate purge agent for substituting the molding raw material. For this reason, a step of substituting the molding raw material before substitution with the purge material and a step of substituting the purge material with the molding raw material after substitution are not required. Thus, it is possible to decrease the number of steps for the substitution. Further, it is possible to perform the substitution of the molding raw material for a short period of time, in accordance with a condition such as the type of molding raw material. Furthermore, the cleaning agent composition according to Embodiment 1 may be added to the molding raw material before substitution, may be added to the molding raw material after substitution, or may be added to both of the molding raw material before substitution and the molding raw material after substitution.

<Polyethylene Oxide (PEO)>

A polymer having a chemical structure that is represented by Formula (I) described below can be used as the polyethylene oxide (hereinafter, also referred to as "PEO"). The PEO, for example, can be obtained by a ring-opening polymerization of ethylene oxide.

Formula (I)

In Formula (I), n is a natural number, and represents a polymerization degree.

The PEO may be a copolymer having not only a constituent unit derived from ethylene oxide but also other constituent units. Examples of a monomer providing other constituent units are propylene, allyl glycidyl ether having a glycidyl group, and the like.

Weight average molecular weight of the PEO is preferably greater than or equal to 50000, more preferably greater than or equal to 100000 and particularly preferably within a range of 100000 to 10000000. By virtue of the weight average molecular weight of the PEO of greater than or equal to 50000, it is possible to sufficiently disperse the cleaning agent composition to the next molding raw material (the molding raw material after substitution) and to improve a substitution effect and a cleaning effect when the PEO is added to the molding raw material before substitution. In addition, by virtue of the weight average molecular weight of the PEO of greater than or equal to 50000, it is possible to maintain excellent molding properties.

<Glycerin Fatty Acid Ester>

The glycerin fatty acid ester is a compound in which glycerin that is trihydric alcohol and a fatty acid are bonded to each other by an ester bond. As represented in Formulas (II) to (IV) described below, the glycerin fatty acid ester can be monoglyceride (Formula (II): monoester), diglyceride (Formula (III): diester), or triglyceride (Formula (IV): triester) in accordance with the number of fatty acids forming the ester bond with glycerin.

Formula (II)

In Formula (II), $R^1$ is a hydrocarbon group.

Formula (III)

In Formula (III), each of $R^2$ and $R^3$ is independently a hydrocarbon group.

Formula (IV)

In Formula (IV), each of $R^4$ to $R^6$ is independently a hydrocarbon group.

In the fatty acid, the number of carbon atoms of the hydrocarbon groups that are represented by $R^1$ to $R^6$ is not particularly limited, and it is preferable that each of the hydrocarbon groups independently has carbon atoms of greater than or equal to 16. The fatty acid is preferably a saturated fatty acid not having a double bond and is preferably a straight chain fatty acid not having a branched chain. Examples of such a fatty acid include a stearic acid (18 carbon atoms), a behenic acid (22 carbon atoms), a montanoic acid (32 carbon atoms), and the like. Such a fatty acid is excellent in thermal stability or lubricating properties.

It is preferable that a melting temperature of the glycerin fatty acid ester is higher than or equal to 60° C. Glycerin fatty acid ester that is a liquid state at a normal temperature or is molten at a low temperature of lower than 60° C. is not preferable as the glycerin fatty acid ester in Embodiment 1.

<Polyglycerin Fatty Acid Ester>

The polyglycerin fatty acid ester is an esterification product of polyglycerin and a fatty acid. By changing a polymerization degree or an esterification rate of the polyglycerin, it is possible to suitably change the properties of the polyglycerin fatty acid ester to hydrophobicity from hydrophilicity. Examples of the polyglycerin fatty acid ester include diglycerin fatty acid ester having a polymerization degree of 2 to decaglycerin fatty acid ester having a polymerization degree of 10.

<Sorbitan Fatty Acid Ester>

The sorbitan fatty acid ester is a compound in which sorbitan having four hydroxyl groups and a fatty acid are bonded to each other by an ester bond. The same fatty acids that are exemplified as the fatty acid of the glycerin fatty acid ester described above can be used as the fatty acid.

Specifically, sorbitan monostearate, sorbitan tristearate, and the like can be used as the sorbitan fatty acid ester.

It is preferable that a melting temperature of the sorbitan fatty acid ester is higher than or equal to 60° C. Sorbitan fatty acid ester that is a liquid state at a normal temperature or is molten at a low temperature of lower than 60° C. is not preferable as the sorbitan fatty acid ester in Embodiment 1.

In the cleaning agent composition, each of the glycerin fatty acid ester, the polyglycerin fatty acid ester, and the sorbitan fatty acid ester can be independently used or can be used together. In addition, a plurality of types of glycerin fatty acid esters, polyglycerin fatty acid esters, and sorbitan fatty acid esters may be used together. In a case where the glycerin fatty acid ester, the polyglycerin fatty acid ester, and the sorbitan fatty acid ester are used together, a ratio of the glycerin fatty acid ester, the polyglycerin fatty acid ester and the sorbitan fatty acid ester is not particularly limited.

<Metal Salt of Fatty Acid and/or Hydroxyfatty Acid>

A fatty acid having carbon atoms of greater than or equal to 14 can be used as the fatty acid. A hydroxyfatty acid having a hydroxyl group and carbon atoms of greater than or equal to 14 can be used as the hydroxyfatty acid. The number of carbon atoms of the fatty acid and the hydroxyfatty acid is preferably greater than or equal to 14 and is more preferably greater than or equal to 16. The fatty acid and the hydroxyfatty acid are preferably a saturated hydroxyfatty acid not having a double bond, and are preferably a straight chain fatty acid and a straight chain hydroxyfatty acid not having a branched chain.

Specifically, a palmitic acid (16 carbon atoms), a stearic acid (18 carbon atoms), a behenic acid (22 carbon atoms), and the like can be used as the fatty acid.

Specifically, a hydroxypalmitic acid (16 carbon atoms), a hydroxystearic acid (18 carbon atoms), a hydroxybehenic acid (22 carbon atoms), and the like can be used as the hydroxyfatty acid.

A metal element that forms a metal salt with the fatty acid and the hydroxyfatty acid is not particularly limited insofar as the metal element is capable of forming the metal salt with the fatty acid and the hydroxyfatty acid described above, and among the metal elements, an alkali metal and an alkali earth metal are preferable, and sodium and lithium are particularly preferable. Furthermore, in the cleaning agent composition, one type of metal salt of the fatty acid and the hydroxyfatty acid may be independently used, a plurality of different types of fatty acids and hydroxyfatty acids and/or a plurality of different types of metal elements may be used together. In a case where a plurality of types of metal elements are used together, a content ratio thereof is not limited.

<Other Additives>

In the cleaning agent composition, additives may be contained in addition to each of the constituents described above. For example, various components such as an antioxidant, a plasticizing material, a dispersant, a colorant, a filler, a reinforcement fiber, and a lubricant may be contained in the cleaning agent composition.

<Formulation Ratio>

In the cleaning agent composition, a formulation ratio of at least one type of fatty acid ester that is selected from the glycerin fatty acid ester, the polyglycerin fatty acid ester, and the sorbitan fatty acid ester is preferably 25 parts by weight to 90 parts by weight, more preferably 30 parts by weight to 75 parts by weight, even more preferably 30 parts by weight to 60 parts by weight and particularly preferably 35 parts by weight to 50 parts by weight, with respect to 100 parts by weight of the polyethylene oxide (PEO). By setting the formulation ratio described above greater than or equal to 25 parts by weight, it becomes possible to maintain an excellent substitution effect. By setting the formulation ratio described above less than or equal to 90 parts by weight, it becomes possible to prevent the molding raw material from being difficult to be fed into a hot runner flow channel due to the occurrence of the slipping of the molding raw material in a cylinder of an injection molding machine 3 that feeds the molding raw material to a fixed mold 1. Accordingly, it becomes possible to efficiently perform the substitution of the molding raw material in the hot runner flow channel.

In the cleaning agent composition, a formulation ratio of a metal salt of the fatty acid and/or the hydroxyfatty acid is 15 parts by weight to 45 parts by weight, preferably 15 parts by weight to 40 parts by weight and particularly preferably 20 parts by weight to 35 parts by weight, with respect to 100 parts by weight of the PEO. By setting the formulation ratio described above greater than or equal to 15 parts by weight, it becomes possible to maintain the lubricating properties of the cleaning agent composition, and dispersibility in the molding raw material excellent. By setting the formulation ratio described above less than or equal to 45 parts by weight, it becomes possible to maintain the lubricating properties of the molding raw material in the hot runner flow channel excellent without making the lubricating properties excessive.

Embodiment 2

Hereinafter, a molding raw material according to Embodiment 2 of the present invention will be described. The molding raw material according to Embodiment 2 contains a molding raw material thermoplastic resin as a main material of a molding raw material and the cleaning agent composition according to Embodiment 1 described above. That is, in the molding raw material according to Embodiment 2, the cleaning agent composition according to Embodiment 1 is added to the molding raw material thermoplastic resin as the main material of the molding raw material.

The molding raw material thermoplastic resin is not particularly limited and examples of the molding raw material thermoplastic resin include a saturated polyester resin such as a polypropylene resin (PP resin), an acrylonitrile-butadiene-styrene copolymerization synthetic resin (ABS resin), a polycarbonate resin (PC resin), polyethylene terephthalate (PET), and polybutylene terephthalate (PBT), an acrylic resin such as polymethyl methacrylate (PMMA), a polyamide resin such as polyamide 6 (PA6) and polyamide 12 (PA12), a thermoplastic elastomer such as a styrene-ethylene-butylene-styrene (SEBS) resin, a styrene-butylene-styrene (SBS) resin, and an olefin-based resin, and the like.

It is preferable that, in the molding raw material, an addition ratio of the cleaning agent composition is an addition ratio in which the slipping of the molding raw material does not occur in a lower portion of a hopper of the cylinder provided in the molding machine. Specifically, the addition ratio of the cleaning agent composition is preferably 8 parts by weight to 60 parts by weight, more preferably 8 parts by weight to 40 parts by weight and particularly preferably 10 parts by weight to 40 parts by weight, with respect to 100 parts by weight of the molding raw material thermoplastic resin. In the molding raw material, a content ratio of the cleaning agent composition is preferably approximately 7 weight % to 38 weight %, more preferably approximately 7 weight % to 29 weight % and particularly preferably approximately 9 weight % to 29 weight %.

Furthermore, the addition ratio of the cleaning agent composition can be suitably changed in accordance with the shape of a product mold and the structure of the injection molding machine 3 and the hot runner flow channel of the fixed mold 1.

In the molding raw material, additives may be contained in addition to the molding raw material thermoplastic resin and the cleaning agent composition. For example, various components such as an antioxidant, a plasticizing material, a dispersant, a colorant, a filler, a reinforcement fiber, and a nucleating agent may be contained in the molding raw material.

<Fixed Mold 1>

Figure 1:
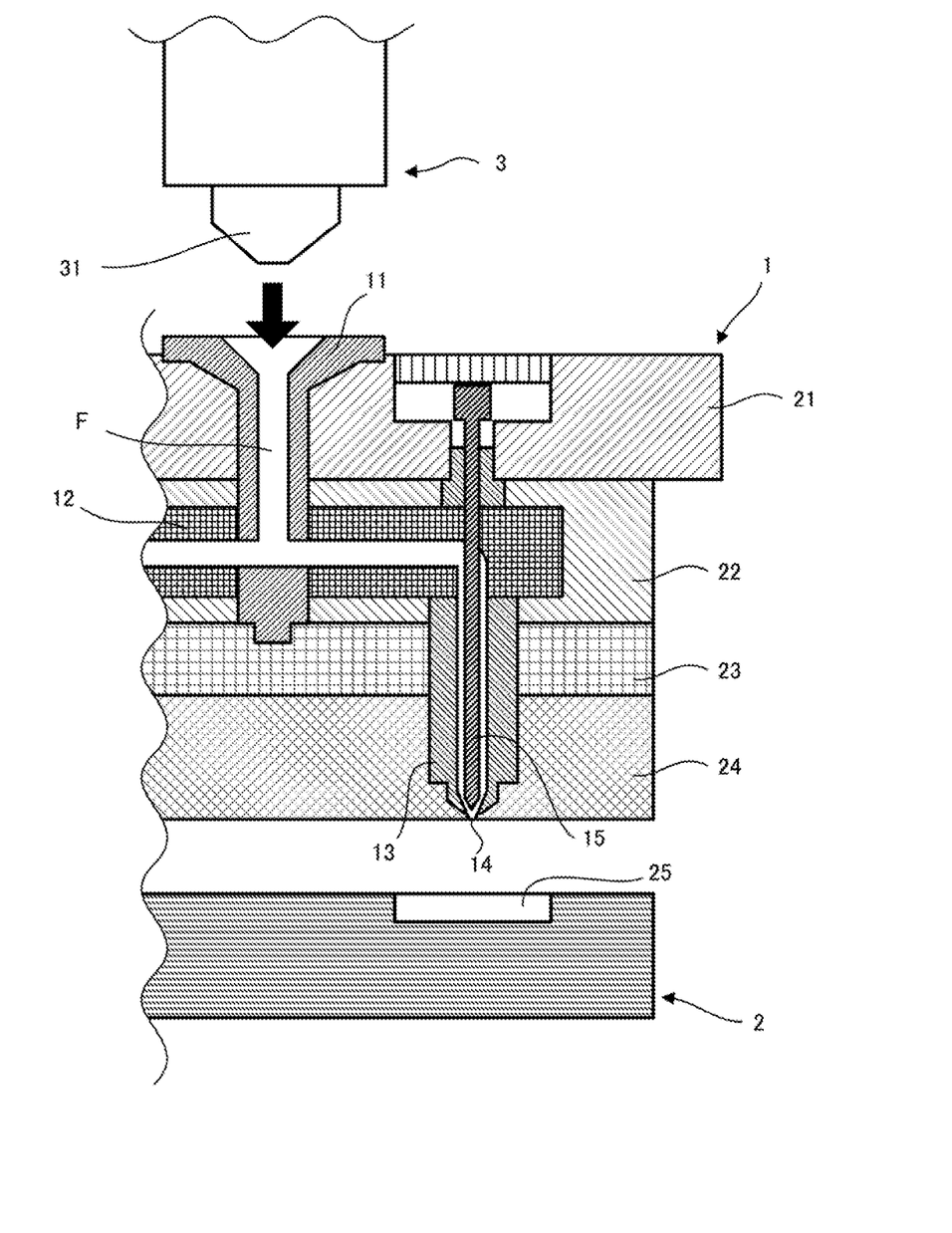
FIG. 1 is a sectional view of main parts illustrating an example of a hot runner type mold.

The molding raw material can be used in injection molding using the hot runner type fixed mold 1 as illustrated in FIG. 1. FIG. 1 is a sectional view of main parts illustrating an example of a hot runner type mold. The molding raw material that is fed from the injection molding machine 3 is introduced to the fixed mold 1, the molding raw material is circulated in a flow channel F that is warmed, and the molding raw material is injected into a cavity of a movable mold 2 from a gate 14 so that a molded body is prepared.

The hot runner flow channel F formed in the fixed mold 1 is warmed such that the molding raw material in the hot runner flow channel F is excellently circulated. The hot runner type fixed mold 1 is also referred to as a hot half. In the injection molding machine 3, the molding raw material thermoplastic resin as the main material of the molding raw material, the cleaning agent composition, and as necessary, other additives are mixed and kneaded so that the molding raw material is prepared. By changing the molding raw material that is fed from the injection molding machine 3, the material of an injection molding product, that is, the characteristics, the color, or the like of the injection molding product can be changed.

The flow channel F of the fixed mold 1 is formed by a hollow portion of each hollow member of a sprue bush 11, a manifold 12, and a probe body 13. That is, the molding raw material that is injected from the injection molding machine 3 is fed to the hollow portion of the sprue bush 11. Next, the molding raw material is circulated in the sprue bush 11 and flows into the hollow portion of the manifold 12 that is communicated with the hollow portion of the sprue bush 11. Next, the molding raw material is circulated in the manifold 12 and flows into the hollow portion of the probe body 13 that is communicated with the hollow portion of the manifold 12. Next, the molding raw material is circulated in the probe body 13 and is injected from the gate 14. Since the sprue bush 11, the manifold 12, and the probe body 13 are warmed, the molding raw material can be circulated in the flow channel F while maintaining a predetermined molten state.

The sprue bush 11, the manifold 12, and the probe body 13 are fixed by an attachment plate 21, a spacer block 22, a back plate 23 and a cavity plate 24.

The gate 14 can be sealed by a valve pin 15. The valve pin 15 is movable in an up and down direction in FIG. 1 and in a case where the valve pin 15 is positioned in the lowermost portion, the gate 14 is sealed. In a case where the valve pin 15 is moved to an upper side in FIG. 1, the gate 14 is opened and the molding raw material can be injected.

The position of the movable mold 2 can be changed at least between a state in which the movable mold 2 is in contact with the fixed mold 1 and a state in which the movable mold 2 is separated from the fixed mold 1, with respect to the fixed mold 1 of which the position is fixed. The movable mold 2 is disposed to be movable on the gate 14 side to which the molding raw material is injected from the fixed mold 1. A cavity 25 is formed in the movable mold 2. The movable mold 2 is configured such that the cavity 25 is disposed at the gate 14 portion of the fixed mold 1 in a contact state. That is, in a state where the fixed mold 1 is in contact with the movable mold 2, the fixed mold 1 and the movable mold 2 are configured such that the molding raw material that is injected from the fixed mold 1 is fed into the cavity 25 that is formed in the movable mold 2. In the hot runner type mold, the movable mold 2 is also referred to as a cold half.

According to the configuration as described above, the fixed mold 1 is capable of directly injecting the molding raw material into the cavity 25 of the movable mold 2 corresponding to the shape of a target molding product. For this reason, a sprue or a runner that is required in the molding of the related art (cold runner type molding) that is not the hot runner type molding is not necessary by using the fixed mold 1. For this reason, it is possible to perform injection molding with respect to a molding product not including a sprue or a runner by using the fixed mold 1.

Hereinafter, the present invention will be described in more detail by using examples. Furthermore, the present invention is not limited to the following examples.

Example 1

A molding raw material prepared by using a cleaning agent composition of a formulation composition shown in Table 1 was subjected to an injection molding test by using the mold illustrated in FIG. 1. Specifically, an injection amount (the number of shots) until the flow channel F filled with the molding raw material containing the cleaning agent composition of Example 1 (the molding raw material before substitution) was substituted with another molding raw material containing the cleaning agent composition of Example 1 (the molding raw material after substitution) was examined.

As shown in Table 1, a cleaning agent composition containing polyethylene oxide, and 20 parts by weight of glycerin fatty acid ester, 10 parts by weight of sorbitan fatty acid ester, and 25 parts by weight of sodium hydroxystearate, with respect to 100 parts by weight of the polyethylene oxide was used as the cleaning agent composition of Example 1. Conditions such as a molding condition, a mold, and materials are as follows.

Molding Raw Material:

Molding Raw Material Thermoplastic Resin: Polypropylene (PP) Resin ("J-106" manufactured by Prime Polymer Co., Ltd.)

Cleaning Agent Composition:

Polyethylene Oxide (PEO): "Alkox E-240" manufactured by Meisei Chemical Works, Ltd., Molecular Weight: Approximately 5000000

Glycerin Fatty Acid Ester: Glycerin Monostearate ("RIKEMAL B-100" manufactured by RIKEN VITAMIN Co., Ltd.)

Polyglycerin Fatty Acid Ester: Tetraglycerin Stearate ("POEM J4081V" manufactured by RIKEN VITAMIN Co., Ltd.)

Sorbitan Fatty Acid Ester: Sorbitan Monostearate ("RHEODOL SP-S10V" manufactured by Kao Corporation)

Sodium Hydroxystearate: "NS-6" manufactured by Nitto Chemical Industry Co., Ltd.

Lithium Stearate: "Li-St" manufactured by Nitto Chemical Industry Co., Ltd.

Addition Amount of Cleaning Agent Composition: 10 Parts by Weight with respect to 100 Parts by Weight of Molding Raw Material Thermoplastic Resin Manufacturing Method of Cleaning Agent Composition: Manufactured by Dry Blend. Specifically, high-speed mixing was performed by using a super mixer manufactured by KAWATA MFG. CO., LTD.

Molding Condition:

Injection Molding Machine: Sumitomo SE130EV (Mold Clamping Force 130 t)

Mold: Mold Capable of Molding Rectangular Parallelepiped Molding Product Having Width of 90 mm, Length of 190 mm, and Thickness of 2.5 mm Molding Temperature: Cylinder . . . 210° C.

Hot Runner Portion (Flow Channel F) . . . 210° C.

Test Method:

A test was performed by the following method. Injection molding was continuously performed with respect to the molding product injected from the fixed mold 1. First, the molding raw material containing the cleaning agent composition (the molding raw material before substitution) flows into the flow channel for resin F in the fixed mold 1 from the injection molding machine 3 through the sprue bush 11, and fills the flow channel for resin F. At this time, a molding raw material containing the molding raw material thermoplastic resin but not the cleaning agent composition was used as the molding raw material before substitution.

Next, the injection molding machine 3 is moved backward, and the fixed mold 1 and a nozzle portion 31 of the injection molding machine 3 are separated from each other. The molding raw material and the cleaning agent composition are put into the injection molding machine 3 and the injection molding machine 3 is operated so as to clean the inside of the injection molding machine 3. Next, the injection molding machine 3 is moved forward and the nozzle portion 31 is brought into contact with the sprue bush 11 portion of the fixed mold 1 so as to set a state in which the molding raw material (the molding raw material after substitution) can be circulated in the flow channel for resin F. Accordingly, the molding raw material after substitution can be fed into the flow channel for resin F in the fixed mold 1 subsequent to the molding raw material before substitution.

At the beginning, by feeding the molding raw material after substitution, a molding product that is molded only with the molding raw material before substitution is injected from the gate 14. And gradually, a molding product is obtained in which both of the molding raw material before substitution and the molding raw material after substitution are mixed. Then, a molding product molded only with the molding raw material after substitution is obtained. The number of molding products (the number of shots) required from obtaining a molding product in a state where the molding raw material after substitution is becoming mixed with the molding raw material before substitution to obtaining the molding product molded only with the molding raw material after substitution was evaluated. Here, a molding raw material colored with black was used as the molding raw material before substitution and an uncolored molding raw material was used as the molding raw material after substitution. Accordingly, in a case where a molding product is obtained in which the black resin is not mixed, it is possible to determine that the molding raw material before substitution is substituted with the molding raw material after substitution in the hot runner flow channel F.

Evaluation Method:

The number of shots (the number of substitution shots) until the molding raw material before substitution was substituted with the molding raw material after substitution in the hot runner flow channel F was evaluated based on the following standards.

Number of Substitution Shots of Less than 40: Excellent (represented by "◯" in Table 1)

Number of Substitution Shots of Greater than or Equal to 40: Poor (represented by "X" in Table 1)

Furthermore, in a case where the molding raw material was poorly prepared, the evaluation was "Poor (x)". The molding raw material being poorly prepared means that, for example, in a case where it was not possible to obtain a molding raw material in which the molding raw material thermoplastic resin and the cleaning agent composition are homogeneously dispersed or in a case where it was not possible to obtain a homogeneously dispersed composition as the cleaning agent composition itself.

In addition, the amount (g) of the molding raw material and the amount (g) of the cleaning agent composition required for cleaning the inside of the injection molding machine 3 were measured. The amount (g) of the molding raw material (the molding raw material after substitution) and the amount (g) of the cleaning agent composition required for cleaning the inside of the injection molding machine 3 are shown in Table 1.

In the case of Example 1, the number of shots (the number of substitution shots) until the molding raw material before substitution is substituted with the molding raw material after substitution was 29 times. The evaluation was "Excellent (◯)". In addition, in the injection molding machine 3, the amount of the molding raw material after substitution that was input until the molding raw material before substitution is substituted with the molding raw material after substitution was "520 g", and the amount of the cleaning agent composition contained in the molding raw material after substitution was "47 g". Such results are shown in Table 1.

TABLE 1

|  |  | Example | | | | | | | | | Comparative Example |
|---|---|---|---|---|---|---|---|---|---|---|
|  |  | 1 | 2 | 3 | 4 | 5 | 6 | 7 | 8 | 9 |
| PEO | (parts by weight) | 100 | 100 | 100 | 100 | 100 | 100 | 100 | 100 | 100 |
| Glycerin fatty acid ester | (parts by weight) | 20 | 17 | 20 | 20 | 15 | 20 | 30 | 30 | 13 |
| Sorbitan fatty acid ester | (parts by weight) | 8 | — | — | 15 | 13 | 33 | 35 | 40 | 8 |
| Polyglycerin fatty acid ester | (parts by weight) | — | 15 | 25 | 15 | 10 | — | 8 | 20 | — |
| Sodium hydroxystearate | (parts by weight) | 15 | 17 | 23 | 25 | 30 | — | 42 | — | 22 |

TABLE 1-continued

| | | Ex 1 | Ex 2 | Ex 3 | Ex 4 | Ex 5 | Ex 6 | Ex 7 | Ex 8 | Comp Ex 9 |
|---|---|---|---|---|---|---|---|---|---|---|
| Lithium stearate | (parts by weight) | — | — | — | — | — | 18 | — | 38 | — |
| Purge agent of related art | (weight %) | — | — | — | — | — | — | — | — | — |
| Amount of molding raw material required for cleaning injection molding machine 3 | (g) | 520 | 500 | 490 | 490 | 510 | 500 | 510 | 520 | 650 |
| Amount of cleaning agent composition required for cleaning injection molding machine 3 | (g) | 47 | 45 | 44 | 44 | 46 | 45 | 46 | 47 | 59 |
| Number of substitution shots | | 29 | 26 | 23 | 18 | 20 | 18 | 25 | 30 | >60 |
| Evaluation | | ○ | ○ | ○ | ○ | ○ | ○ | ○ | ○ | x |

| | | Comparative Example | | | | | |
|---|---|---|---|---|---|---|---|
| | | 10 | 11 | 12 | 13 | 14 | 15 |
| PEO | (parts by weight) | 100 | 100 | 100 | 100 | — | — |
| Glycerin fatty acid ester | (parts by weight) | 30 | 48 | 40 | 45 | — | — |
| Sorbitan fatty acid ester | (parts by weight) | 20 | 50 | 25 | 25 | — | — |
| Polyglycerin fatty acid ester | (parts by weight) | — | — | — | — | — | — |
| Sodium hydroxystearate | (parts by weight) | 50 | 17 | 10 | — | — | — |
| Lithium stearate | (parts by weight) | — | — | — | 10 | — | — |
| Purge agent of related art | (weight %) | — | — | — | — | 31 | 100 |
| Amount of molding raw material required for cleaning injection molding machine 3 | (g) | — | — | 680 | 670 | 650 | 420 |
| Amount of cleaning agent composition required for cleaning injection molding machine 3 | (g) | — | — | 61 | 60 | 202 | 420 |
| Number of substitution shots | | Unavailable in preparation | Unavailable in manufacturing | >60 | >60 | >60 | >60 |
| Evaluation | | x | x | x | x | x | x |

Examples 2 to 8 and Comparative Examples 9 to 13

The injection molding test was performed in the same manner as Example 1 except that a cleaning agent composition of a formulation composition shown in Table 1 was used. The number of substitution shots and an evaluation result are shown in Table 1.

In all of Examples 2 to 8, the number of substitution shots was less than or equal to 30, and the evaluation was "Excellent (○)". In Comparative Examples 9, 12, and 13, the number of substitution shots was greater than 60, and the evaluation was "Poor (x)". In Comparative Example 10, it was not possible to obtain the cleaning agent composition itself as the homogeneously dispersed composition and thus "Unavailable in preparation" was represented. Furthermore, even in a case where the raw material that could not be prepared as the cleaning agent composition was directly added to the molding raw material thermoplastic resin and molded, a molded body was not obtained. In Comparative Example 11, the molded body was not obtained and thus "Unavailable in manufacturing" was represented.

Comparative Example 14

The injection molding test was performed in the same manner as Example 1 except that 31 weight % of a purge agent of a related art in the molding raw material was used instead of the cleaning agent composition. The number of substitution shots and an evaluation result are shown in Table 1.

A purge agent having a composition of approximately 80% of polypropylene (PP) and approximately 20% of triphenyl phosphite was used as the purge agent of a related art. An addition amount of the purge agent of a related art was 45 parts by weight with respect to 100 parts by weight of the molding raw material thermoplastic resin. In Comparative Example 14, the number of substitution shots was greater than 60 and the evaluation was "Poor (x)".

Comparative Example 15

A molding raw material containing only the molding raw material thermoplastic resin was used as the molding raw material before substitution, and the cleaning agent composition or the purge agent of a related art was not added to the molding raw material thermoplastic resin. The purge agent of a related art was put into the injection molding machine 3 subsequent to the molding raw material containing only the molding raw material thermoplastic resin, and the injection molding test was performed by a cleaning method according to a cleaning method of a related art using the purge agent. That is, in Comparative Example 15, the molding raw material before substitution is the molding raw material thermoplastic resin and the molding raw material after substitution is the purge agent of a related art. The number of substitution shots and an evaluation result are shown in Table 1.

In Comparative Example 15, the number of substitution shots was greater than 60 and the evaluation was "Poor (x)". Furthermore, after substitution, another molding raw material containing only the molding raw material thermoplastic resin was put into the injection molding machine 3 subsequent to the purge agent of a related art. The number of substitution shots until the purge agent of a related art was substituted with the another molding raw material was 20. In addition, the molding raw material containing only the molding raw material thermoplastic resin was used as the molding raw material before substitution and a molding raw material in which the purge agent of a related art was added to the molding raw material thermoplastic resin was used as the molding raw material after substitution. In this case, the number of substitution shots until the molding raw material before substitution was substituted with the molding raw material after substitution was greater than 70.

Example 16

The injection molding test was performed in the same manner as Example 1 except that the following molding raw material was used and the following molding condition was set. The number of substitution shots and an evaluation result are shown in Table 2. In Example 16, the number of substitution shots was 31 and the evaluation was "Excellent (○)".

Molding Raw Material:
Molding Raw Material Thermoplastic Resin: Acrylonitrile-Butadiene-Styrene Copolymerization Synthetic Resin (ABS Resin) ("KRALASTIC MVF-1K" manufactured by NIPPON A&L INC.)

Cleaning Agent Composition:
Polyethylene Oxide (PEO): "Alkox E-240" manufactured by Meisei Chemical Works, Ltd., Molecular Weight: Approximately 5000000
Glycerin Fatty Acid Ester: Glycerin Monostearate ("RIKEMAL B-100" manufactured by RIKEN VITAMIN Co., Ltd.)
Polyglycerin Fatty Acid Ester: Tetraglycerin Stearate ("POEM J4081V" manufactured by RIKEN VITAMIN Co., Ltd.)
Sorbitan Fatty Acid Ester: Sorbitan Monostearate ("RHEODOL SP-S10V" manufactured by Kao Corporation)
Sodium Hydroxystearate: "NS-6" manufactured by Nitto Chemical Industry Co., Ltd.
Lithium Stearate: "Li-St" manufactured by Nitto Chemical Industry Co., Ltd.
Addition Amount of Cleaning Agent Composition: 10 Parts by Weight with respect to 100 Parts by Weight of Molding Raw Material Thermoplastic Resin
Mixing Method: Dry Blend
Molding Condition:
Injection Molding Machine: Sumitomo SE130EV (Mold Clamping Force 130 t) Mold: Mold Capable of Molding Rectangular Parallelepiped Molding Product Having Width of 90 mm, Length of 190 mm, and Thickness of 2.5 mm
Molding Temperature: Cylinder . . . 230° C.
Hot Runner Portion (Flow Channel F) . . . 220° C.

TABLE 2

|  |  | Example | | | | | | | | Comparative Example |
|---|---|---|---|---|---|---|---|---|---|---|
|  |  | 16 | 17 | 18 | 19 | 20 | 21 | 22 | 23 | 24 |
| PEO | (parts by weight) | 100 | 100 | 100 | 100 | 100 | 100 | 100 | 100 | 100 |
| Glycerin fatty acid ester | (parts by weight) | 20 | 17 | 20 | 20 | 15 | 20 | 30 | 30 | 13 |
| Sorbitan fatty acid ester | (parts by weight) | 8 | — | — | 15 | 13 | 33 | 35 | 40 | 8 |
| Polyglycerin fatty acid ester | (parts by weight) | — | 15 | 25 | 15 | 10 | — | 8 | 20 | — |
| Sodium hydroxystearate | (parts by weight) | 15 | 17 | 23 | 25 | 30 | — | 42 | — | 22 |
| Lithium stearate | (parts by weight) | — | — | — | — | — | 18 | — | 38 | — |
| Purge agent of related art | (weight %) | — | — | — | — | — | — | — | — | — |
| Amount of molding raw material required for cleaning injection molding machine 3 | (g) | 550 | 560 | 540 | 540 | 550 | 530 | 550 | 560 | 680 |
| Amount of cleaning agent composition required for cleaning injection molding machine 3 | (g) | 50 | 50 | 49 | 49 | 50 | 48 | 50 | 50 | 61 |
| Number of substitution shots | | 31 | 29 | 25 | 22 | 23 | 21 | 28 | 32 | >60 |
| Evaluation | | ○ | ○ | ○ | ○ | ○ | ○ | ○ | ○ | x |

|  |  | Comparative Example | | | | | |
|---|---|---|---|---|---|---|---|
|  |  | 25 | 26 | 27 | 28 | 29 | 30 |
| PEO | (parts by weight) | 100 | 100 | 100 | 100 | — | — |
| Glycerin fatty acid ester | (parts by weight) | 30 | 48 | 40 | 45 | — | — |
| Sorbitan fatty acid ester | (parts by weight) | 20 | 45 | 25 | 25 | — | — |
| Polyglycerin fatty acid ester | (parts by weight) | — | — | — | — | — | — |
| Sodium hydroxystearate | (parts by weight) | 50 | 17 | 10 | — | — | — |
| Lithium stearate | (parts by weight) | — | — | — | 10 | — | — |

TABLE 2-continued

| | | | | | | | 31 | 100 |
|---|---|---|---|---|---|---|---|---|
| Purge agent of related art | (weight %) | — | — | — | — | 31 | 100 |
| Amount of molding raw material required for cleaning injection molding machine 3 | (g) | — | — | 670 | 650 | 700 | 550 |
| Amount of cleaning agent composition required for cleaning injection molding machine 3 | (g) | — | — | 60 | 59 | 217 | 550 |
| Number of substitution shots | | Unavailable in preparation | Unavailable in manufacturing | >60 | >60 | >60 | >60 |
| Evaluation | | x | x | x | x | x | x |

Examples 17 to 23 and Comparative Examples 24 to 28

The injection molding test was performed in the same manner as Example 16 except that a cleaning agent composition of a formulation composition shown in Table 2 was used. The number of substitution shots and an evaluation result are shown in Table 2.

In all of Examples 17 to 23, the number of substitution shots was less than or equal to 32 and the evaluation was "Excellent (◯)". In Comparative Examples 24, 27, and 28, the number of substitution shots was greater than 60 and the evaluation was "Poor (x)". In Comparative Example 25, it was not possible to obtain the cleaning agent composition itself as the homogeneously dispersed composition and thus "Unavailable in preparation" was represented. Furthermore, even in a case where the raw material that could not be prepared as the cleaning agent composition was directly added to the molding raw material thermoplastic resin and molded, a molded body was not obtained. In Comparative Example 26, the molded body was not obtained and thus "Unavailable in manufacturing" is represented.

Comparative Examples 29 and 30

In Comparative Example 29, the injection molding test was performed in the same manner as Comparative Example 14, and in Comparative Example 30, the injection molding test was performed in the same manner as Comparative Example 15, respectively, except that an acrylonitrile-butadiene-styrene copolymerization synthetic resin (an ABS resin) was used as the molding raw material thermoplastic resin. The number of substitution shots and an evaluation result are shown in Table 2. In both of Comparative Examples 29 and 30, the number of substitution shots was greater than 60 and the evaluation was "Poor (x)".

Furthermore, in Comparative Example 30, after the substitution, another molding raw material containing only the molding raw material thermoplastic resin was put into the injection molding machine 3 subsequent to the purge agent of a related art. The number of substitution shots until the purge agent of a related art was substituted with the another molding raw material was 23. In addition, the molding raw material containing only the molding raw material thermoplastic resin was used as the molding raw material before substitution and a molding raw material in which the purge agent of a related art was added to the molding raw material thermoplastic resin was used as the molding raw material after substitution. In this case, the number of substitution shots until the molding raw material before substitution was substituted with the molding raw material after substitution was greater than 70.

Example 31

The injection molding test was performed in the same manner as Example 1 except that the following molding raw material was used and the following molding condition was set. The number of substitution shots and an evaluation result are shown in Table 3. In Example 31, the number of substitution shots was 32, and the evaluation was "Excellent (◯)".

Molding Raw Material:
Molding Raw Material Thermoplastic Resin: Polycarbonate Resin (PC Resin) ("Panlite L-1225L" manufactured by Teijin Limited)
Cleaning Agent Composition:
Polyethylene Oxide (PEO): "Alkox E-240" manufactured by Meisei Chemical Works, Ltd., Molecular Weight: Approximately 5000000
Glycerin Fatty Acid Ester: Glycerin Monostearate ("RIKEMAL B-100" manufactured by RIKEN VITAMIN Co., Ltd.)
Polyglycerin Fatty Acid Ester: Tetraglycerin Stearate ("POEM J4081V" manufactured by RIKEN VITAMIN Co., Ltd.)
Sorbitan Fatty Acid Ester: Sorbitan Monostearate ("RHEODOL SP-S10V" manufactured by Kao Corporation)
Sodium Hydroxystearate: "NS-6" manufactured by Nitto Chemical Industry Co., Ltd.
Lithium Stearate: "Li-St" manufactured by Nitto Chemical Industry Co., Ltd.
Addition Amount of Cleaning Agent Composition: 15 Parts by Weight with respect to 100 Parts by Weight of Molding Raw Material Thermoplastic Resin
Mixing Method: Dry Blend
Molding Condition:
Injection Molding Machine: Sumitomo SE130EV (Mold Clamping Force 130 t)
Mold: Mold Capable of Molding Rectangular Parallelepiped Molding Product Having Width of 90 mm, Length of 190 mm, and Thickness of 2.5 mm
Molding Temperature: Cylinder . . . 280° C.
Hot Runner Portion (Flow Channel F) . . . 270° C.

TABLE 3

| | | | Example | | | | | | | Comparative Example |
|---|---|---|---|---|---|---|---|---|---|---|
| | | | 31 | 32 | 33 | 34 | 35 | 36 | 37 | 38 | 39 |
| PEO | (parts by weight) | 100 | 100 | 100 | 100 | 100 | 100 | 100 | 100 | 100 |
| Glycerin fatty acid ester | (parts by weight) | 20 | 17 | 20 | 20 | 15 | 20 | 30 | 30 | 13 |

TABLE 3-continued

| | | | | | | | | | | |
|---|---|---|---|---|---|---|---|---|---|---|
| Sorbitan fatty acid ester | (parts by weight) | 8 | — | — | 15 | 13 | 33 | 35 | 40 | 8 |
| Polyglycerin fatty acid ester | (parts by weight) | — | 15 | 25 | 15 | 10 | — | 8 | 20 | — |
| Sodium hydroxystearate | (parts by weight) | 15 | 17 | 23 | 25 | 30 | — | 42 | — | 22 |
| Lithium stearate | (parts by weight) | — | — | — | — | — | 18 | — | 38 | — |
| Purge agent of related art | (weight %) | — | — | — | — | — | — | — | — | — |
| Amount of molding raw material required for cleaning njection molding machine 3 | (g) | 600 | 650 | 600 | 590 | 570 | 600 | 640 | 650 | 780 |
| Amount of cleaning agent composition required for cleaning injection molding machine 3 | (g) | 78 | 85 | 78 | 77 | 74 | 78 | 83 | 85 | 101 |
| Number of substitution shots | | 32 | 30 | 26 | 23 | 25 | 22 | 29 | 32 | >60 |
| Evaluation | | ○ | ○ | ○ | ○ | ○ | ○ | ○ | ○ | x |

| | | Comparative Example | | | | | |
|---|---|---|---|---|---|---|---|
| | | 40 | 41 | 42 | 43 | 44 | 45 |
| PEO | (parts by weight) | 100 | 100 | 100 | 100 | — | — |
| Glycerin fatty acid ester | (parts by weight) | 30 | 48 | 40 | 45 | — | — |
| Sorbitan fatty acid ester | (parts by weight) | 20 | 50 | 25 | 25 | — | — |
| Polyglycerin fatty acid ester | (parts by weight) | — | — | — | — | — | — |
| Sodium hydroxystearate | (parts by weight) | 50 | 17 | 10 | — | — | — |
| Lithium stearate | (parts by weight) | — | — | — | 10 | — | — |
| Purge agent of related art | (weight %) | — | — | — | — | 31 | 100 |
| Amount of molding raw material required for cleaning njection molding machine 3 | (g) | — | — | 760 | 770 | 790 | 670 |
| Amount of cleaning agent composition required for cleaning injection molding machine 3 | (g) | — | — | 99 | 100 | 245 | 670 |
| Number of substitution shots | | Unavailable in preparation | Unavailable in manufacturing | >60 | >60 | >60 | >60 |
| Evaluation | | x | x | x | x | x | x |

Examples 32 to 38 and Comparative Examples 39 to 43

The injection molding test was performed in the same manner as Example 31 except that a cleaning agent composition of a formulation composition shown in Table 3 was used. The number of substitution shots and an evaluation result are shown in Table 3.

In all of Examples 32 to 38, the number of substitution shots was less than 40 and the evaluation was "Excellent (○)". In Comparative Examples 39, 42, and 43, the number of substitution shots was greater than 60 and the evaluation was "Poor (x)". In Comparative Example 40, it was not possible to obtain the cleaning agent composition itself as the homogeneously dispersed composition and thus "Unavailable in preparation" was represented. Furthermore, even in a case where the raw material that could not be prepared as the cleaning agent composition was directly added to the molding raw material thermoplastic resin and molded, a molded body was not obtained. In Comparative Example 41, the molded body was not obtained.

Comparative Examples 44 and 45

In Comparative Example 44, the injection molding test was performed in the same manner as Comparative Example 14, and in Comparative Example 45, the injection molding test was performed in the same manner as Comparative Example 15, respectively, except that an acrylonitrile-styrene resin (an AS resin) was used as the molding raw material thermoplastic resin. The number of substitution shots and an evaluation result are shown in Table 3. In both of Comparative Examples 44 and 45, the number of substitution shots was greater than 60 and the evaluation was "Poor (x)".

Furthermore, in Comparative Example 45, after the substitution, another molding raw material containing only the molding raw material thermoplastic resin was put into the injection molding machine 3 subsequent to the purge agent of a related art. The number of substitution shots until the purge agent of the related art was substituted with the another molding raw material was 25. In addition, the molding raw material containing only the molding raw material thermoplastic resin was used as the molding raw material before substitution and the molding raw material in which the purge agent of a related art was added to the molding raw material thermoplastic resin was used as the molding raw material after substitution. In this case, the number of substitution shots until the molding raw material before substitution was substituted with the molding raw material after substitution was greater than 70.

As described above, preferred embodiments of the present invention have been described, but the present invention is not limited thereto and various modifications or changes can be made within the scope of the point. For example, the present invention includes the following points.

(Point 1) A cleaning agent composition contains: 100 parts by weight of polyethylene oxide; 25 parts by weight to 90 parts by weight of at least one type of fatty acid ester that is selected from glycerin fatty acid ester, polyglycerin fatty acid ester, and sorbitan fatty acid ester; and 15 parts by weight to 45 parts by weight of a metal salt of a fatty acid and/or a hydroxyfatty acid, and is used for cleaning a flow channel for resin in a hot runner type mold.

Accordingly, it is possible to efficiently perform the substitution of the molding raw material in the hot runner type mold.

(Point 2) In a case where a first molding raw material filling the flow channel for resin is substituted with a second molding raw material, the cleaning agent composition may be used by being added to the first molding raw material, the second molding raw material, or both of the first molding raw material and the second molding raw material.

(Point 3) In the cleaning agent composition, molecular weight of the polyethylene oxide may be greater than or equal to 100000.

(Point 4) In the cleaning agent composition, the metal salt may be a sodium salt and/or a lithium salt.

(Point 5) A molding raw material contains the cleaning agent composition and a thermoplastic resin, and is used as a raw material in hot runner type injection molding.

REFERENCE SIGNS LIST

1: fixed mold
11: sprue bush
12: manifold
13: probe body
14: gate
15: valve pin
21: attachment plate
22: spacer block
23: back plate
24: cavity plate
25: cavity
2: movable mold
3: injection molding machine
31: nozzle portion
F: flow channel

What is claimed is:
1. A cleaning agent composition, comprising:
100 parts by weight of polyethylene oxide having a weight-average molecular weight of between 1,600,000 and 10 million;
25 parts by weight to 90 parts by weight of a fatty acid ester that is selected from the group consisting of a glycerin fatty acid ester, a polyglycerin fatty acid ester, a sorbitan fatty acid ester, and combinations thereof; and
15 parts by weight to 45 parts by weight of a metal salt of a fatty acid and/or a hydroxyfatty acid,
wherein the cleaning agent composition is used for cleaning a flow channel for resin in a hot runner type mold.
2. The cleaning agent composition according to claim 1, wherein in a case where a first molding raw material filling the flow channel for resin is substituted with a second molding raw material, the cleaning agent composition is used by being added to the first molding raw material, the second molding raw material, or both of the first molding raw material and the second molding raw material.
3. The cleaning agent composition according to claim 1, wherein the weight-average molecular weight of the polyethylene oxide is greater than or equal to 100000.
4. The cleaning agent composition according to claim 1, wherein the metal salt is a sodium salt and/or a lithium salt.
5. A molding raw material, comprising:
8 parts by weight to 60 parts by weight of the cleaning agent composition according to claim 1; and
100 parts by weight of a thermoplastic resin,
wherein the molding raw material is used as a raw material in hot runner type injection molding.
6. The cleaning agent composition according to claim 2, wherein molecular weight of the polyethylene oxide is greater than or equal to 100000.
7. The cleaning agent composition according to claim 2, wherein the metal salt is a sodium salt and/or a lithium salt.
8. The cleaning agent composition according to claim 3, wherein the metal salt is a sodium salt and/or a lithium salt.
9. A molding raw material, comprising:
the cleaning agent composition according to claim 2; and
a thermoplastic resin,
wherein the molding raw material is used as a raw material in hot runner type injection molding.
10. A molding raw material, comprising:
the cleaning agent composition according to claim 3; and
a thermoplastic resin,
wherein the molding raw material is used as a raw material in hot runner type injection molding.
11. A molding raw material, comprising:
the cleaning agent composition according to claim 4; and
a thermoplastic resin,
wherein the molding raw material is used as a raw material in hot runner type injection molding.
12. A molding raw material, comprising:
the cleaning agent composition according to claim 6; and
a thermoplastic resin,
wherein the molding raw material is used as a raw material in hot runner type injection molding.
13. A molding raw material, comprising:
the cleaning agent composition according to claim 7; and
a thermoplastic resin,
wherein the molding raw material is used as a raw material in hot runner type injection molding.
14. A molding raw material, comprising:
the cleaning agent composition according to claim 8; and
a thermoplastic resin,
wherein the molding raw material is used as a raw material in hot runner type injection molding.
15. The cleaning agent composition according to claim 1, wherein the glycerin fatty acid ester has a melting point of 60° C. or higher, wherein the polyglycerin fatty acid ester has a polymerization degree of between two and 10, and wherein the sorbitan fatty acid ester has a melting point of 60° C. or higher.
16. A cleaning agent composition, comprising:
100 parts by weight of polyethylene oxide having a weight-average molecular weight of between 50,000 and 10 million;
15 parts by weight to 30 parts by weight of a glycerin fatty acid ester;

at least one of: (i) 8 parts by weight to 40 parts by weight of a sorbitan fatty acid ester, and (ii) 8 parts by weight to 25 parts by weight of a polyglycerin fatty acid ester;

15 parts by weight to 45 parts by weight of a metal salt of a fatty acid and/or a hydroxyfatty acid, wherein the cleaning agent composition is used for cleaning a flow channel for resin in a hot runner type mold.

* * * * *